United States Patent [19]

Yamashita et al.

[11] Patent Number: 4,777,993

[45] Date of Patent: Oct. 18, 1988

[54] TIRE TREAD PATTERN

[75] Inventors: Takashi Yamashita; Kazuyoshi Saneto, both of Hiratsuka, Japan

[73] Assignee: The Yokohama Rubber Co., Ltd., Tokyo, Japan

[21] Appl. No.: 628,852

[22] Filed: Jul. 9, 1984

[30] Foreign Application Priority Data

Jul. 11, 1983 [JP] Japan ................................ 58-124665

[51] Int. Cl.$^4$ ............................................ B60C 11/11
[52] U.S. Cl. ............................ 152/209 R; 152/209 A
[58] Field of Search .......... 152/209 R, 209 D, 209 A, 152/209 B

[56] References Cited

U.S. PATENT DOCUMENTS 1,956,011  4/1934  Evans ............................. 152/209 R Primary Examiner—Michael Ball
Attorney, Agent, or Firm—Finnegan, Henderson, Farabow, Garrett and Dunner

[57] ABSTRACT

In a tire tread pattern in which a plurality of block patterns are disposed on a tire tread surface in the circumferential direction and their pitch lengths are varied, lug grooves inside of said block patterns extend in the direction of a grounding width, and their angles relative to the direction of grounding width are varied in accordance with the change of the pitch lengths of said block patterns.

2 Claims, 4 Drawing Sheets

TIRE TREAD PATTERN

This invention relates to a tire tread pattern consisting of a plurality of block patterns defined on a tire tread surface in the circumferential direction.

As the road surface conditions has been improved in recent years, an attempt has also been made to reduce the noise of vehicles, and reduction of the noise generated from the tires or so-called "pattern noise", has been earnestly desired.

In order to reduce the pattern noise, an improvement in the basic design of a tire tread pattern consisting of a plurality of block patterns defined on the tire thread surface in the circumferential direction, and pitch variation which varies the pitch lengths of the block patterns have been attempted conventionally. However, these methods have not yet been entirely sufficient to reduce the pattern noise.

The present invention is therefore directed to eliminate the problem described above, and to provide a tire tread pattern which reduces the pattern noise more greatly than the conventional pitch variation method by changing the orientation angles of subgrooves (lug grooves) in the block patterns, besides the pitch variation method described above.

In a tire tread pattern in which a plurality of block patterns are defined on a tire tread surface in the circumferential direction and their pitch lengths are varied, the tire tread pattern in accordance with the present invention is characterized in that lug grooves inside the block patterns extend in the direction of grounding width, and their angles relative to the direction of grounding width of the lug grooves is varied in accordance with the change of the pitch lengths of the block patterns.

Hereinafter, the construction of the present invention will be described in detail with reference to the accompanying drawings.

Generally, the occurrence of the pattern noise from a tire depends greatly upon the basic length of the pattern (the pitch length of the block pattern), and this is a well known fact in the art. In a tire tread pattern, therefore, several kinds of pitch lengths are prepared, and a certain method has been used which involves the steps, for example, of modelling the shape of acoustic pressure at each pitch, expressing the acoustic pressure waveform by the Fourier's function, analyzing it, and employing the pitch variation having a low sound level or making flat the frequency and characteristics in order to reduce offensive feel and to improve the pattern noise. In the conventional tread pattern, patterning has been made in such a fashion that even if each pitch length varies, the angle in the direction of lug grooves extending in the direction of the grounding width remains at the same angle.

1, 2, 3—block pattern,
4, 5, 6, 4', 5', 6'—lug grooves.

Figure 1:
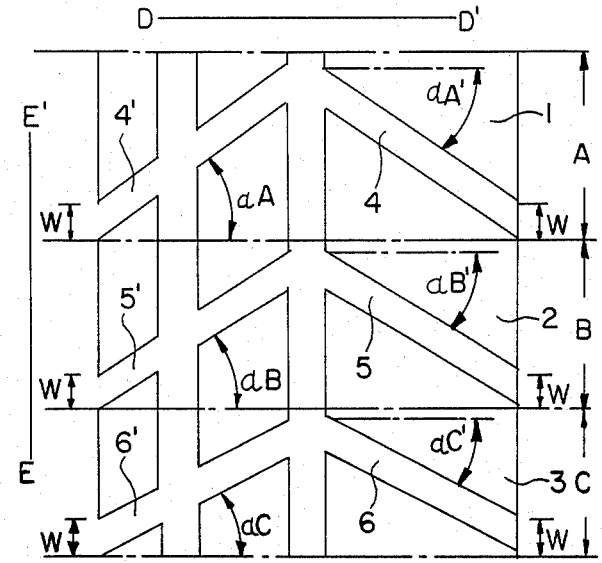
FIGS. 1 and 2 shows examples of the tire tread patterns in accordance with the present invention, respectively.
Figure 2:
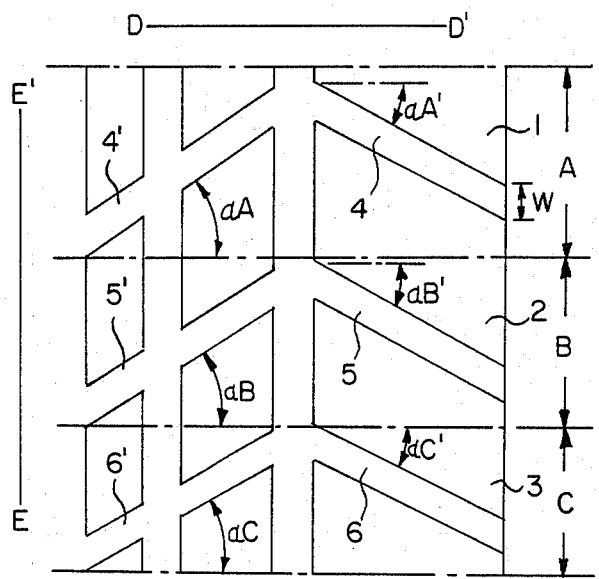

In contrast, the tire tread pattern is constituted in the present invention as shown in FIGS. 1 and 2.

In FIG. 1, each block pattern 1, 2, 3 is disposed continuously and repeatedly in the circumferential direction EE' of the tire. Lug grooves 4, 5, 6, 4', 5', 6' inside these block patterns 1, 2, 3 extend in the direction of grounding width DD' of the tire, and their angles $\alpha_A$, $\alpha_B$, $\alpha_C$, $\alpha_{A'}$, $\alpha_{B'}$, $\alpha_{C'}$ relative to the direction of grounding width correspond to the changes of the pitch lengths A, B, C of the block patterns 1, 2, 3, respectively. In other words, they satisfy the relation $\tan\alpha_C$:$\tan\alpha_B$: $\tan\alpha_{A'} = \tan\alpha_{C'}$:$\tan\alpha_{B'}$:$\tan\alpha_A = C-W$:$B-W$:$A-W$, where W represents the groove width. More definitely, if A=48 mm, B=41 mm, C=36 mm and W=6 mm, $\alpha_A = 39.5°$, $\alpha_B = 34.5°$, $\alpha_C = 30.5°$,
$\alpha_{A'} = 40°$, $\alpha_{B'} = 35.0°$, $\alpha_{C'} = 31.0°$.

In FIG. 2, like reference numerals are used to identify like constituents or portions as in FIG. 1. In FIG. 2, the angles $\alpha_A$, $\alpha_B$, $\alpha_C$, $\alpha_{A'}$, $\alpha_{B'}$, $\alpha_{C'}$ vary in accordance with the changes of the pitch lengths A, B, C of the block patterns 1, 2, 3 in the same way as in FIG. 1, but not at the same change ratio as that of angle change of the pitch ratio in FIG. 1, that is, they change independently. In this case, $\tan\alpha_A$:$\tan\alpha_B$:$\tan\alpha_C \neq (A-W)$:$(B-W)$:$(C-W)$, and $\tan\alpha_C < \tan\alpha_B < \tan\alpha_A$, $\tan\alpha_{C'} < \tan\alpha_{B'} < \tan\alpha_{A'}$. More definitely, if A=48 mm, B=41 mm, C=36 mm and W=6 mm, $\alpha_A = 38.8°$, $\alpha_B = 35.2°$, $\alpha_C = 32.9°$,
$\alpha_{A'} = 39.4°$, $\alpha_{B'} = 35.8°$, $\alpha_{C'} = 31.0°$.

In FIGS. 1 and 2, the contraction of the pattern due to the decrease in the circumferential length at the shoulder portion is not included because the shoulder portion must be contracted so as to correspond to the decrease of the circumferential length in any kinds of tires.

Figure 3:
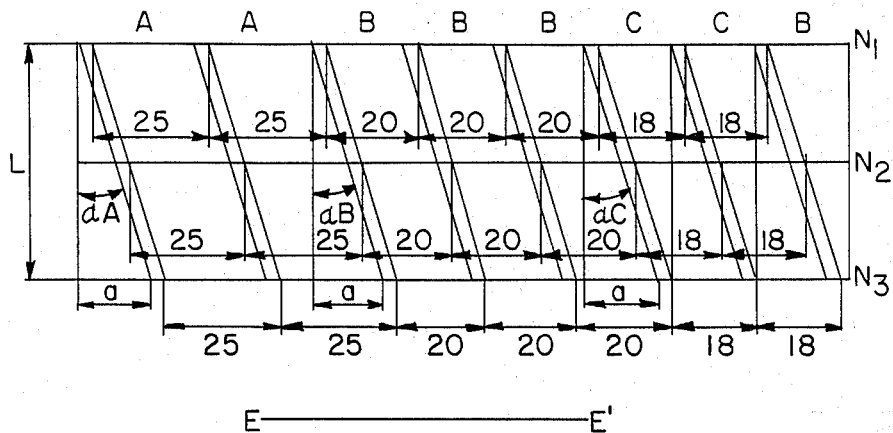
FIG. 3 is an exploded view of the tire tread pattern and shows the pitch variation.
Figure 3:
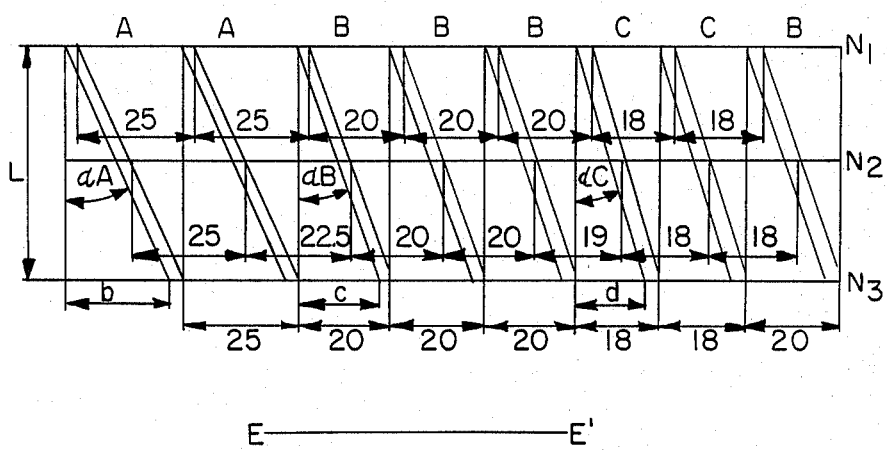
Figure 3:
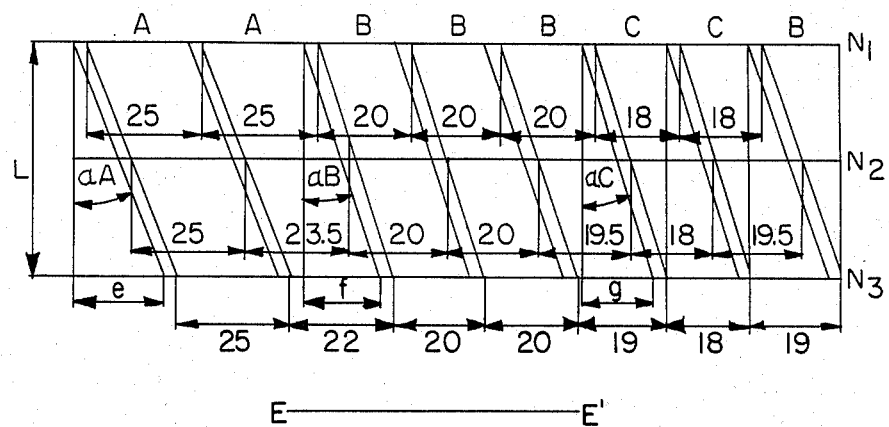
Figure 3:
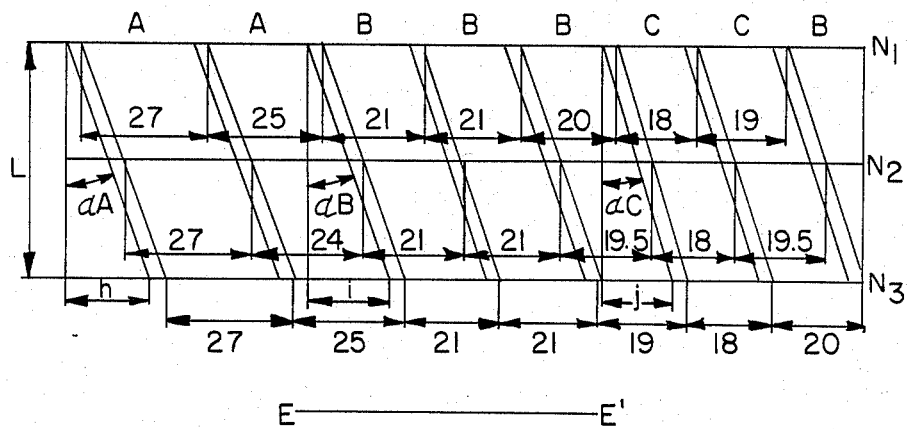

Next, the pitch variation in the present invention will be described. FIG. 3 is an exploded view of the tread pattern when the pitch variation is AABBBCCB.

In FIG. 3(1), $\alpha_A = \tan^{-1} a/L$, $\beta_B = \tan^{-1} a/L$, $\alpha_C = \tan^{-1} a/L$ and $\alpha_A = \alpha_B = \alpha_C$. More definitely, A=25 mm, B=20 mm, C=18 mm, L=50 mm, a=15 mm, $\alpha_A = \alpha_B = \alpha_C = 16.7°$, and W=3 mm.

In FIG. 3(2), $\alpha_A = \tan^{-1} b/L$, $\alpha_B = \tan^{-1} c/L$, $\alpha_C = \tan^{-1} d/L$, and $\tan\alpha_A$:$\tan\alpha_B$:$\tan\alpha_C = (A-W)$:$(B-W)$:$(C-W)$. More definitely, A=25 mm, B=20 mm, C=18 mm, L=50 mm, b=22 mm, c=17 mm, d=15 mm, $\alpha_A = 23.7°$, $\alpha_B = 18.8°$, $\alpha_C = 16.7°$, and W=3 mm.

In FIG. 3(3), $\alpha_A = \tan^{-1} e/L$, $\alpha_B = \tan^{-1} f/L$, $\alpha_C = \tan^{-1} g/L$, $\tan\alpha_A > \tan\alpha_B > \tan\alpha_C$, and $\tan\alpha_A$:$\tan\alpha_B$:$\tan\alpha_C = (A-W)$:$(B-W)$:$(C-W)$. More definitely, A=25 mm, B=20 mm, C=18 mm, L=50 mm, e=19 mm, f=16 mm, g=15 mm, $\alpha_A = 20.8°$, $\alpha_B = 17.7°$, $\alpha_C = 16.7°$, and W=3 mm.

In FIG. 3(4), $\alpha_A = \tan^{-1} h/L$, $\alpha_B = \tan^{-1} i/L$, $\alpha_C = \tan^{-1} j/L$, $\tan\alpha_A$:$\tan\alpha_B$:$\tan\alpha_C \neq (A-W)$:$(B-W)$:$(C-W)$. More definitely, A=27 mm, B=21 mm, C=18 mm, L=50 mm, h=19 mm, i=16 mm, j=15 mm, $\alpha_A = 20.8°$, $\alpha_B = 17.7°$, $\alpha_C = 16.7°$, and W=3 mm.

FIG. 3(1) shows the conventional case in which the angle α in the direction of lug grooves is constant. FIG. 3(2) shows one of the types of this invention, in which the angle α in the direction of the lug grooves is varied at the same ratio as the change ratio of the pitch lengths. FIG. 3(3) shows another type of the present invention, in which the angle $\alpha_B$ in the lug groove direction of the pitch length B, which is the intermediate among the pitch lengths A, B and C, is varied so as to satisy the relation $\tan\alpha_C < \tan\alpha_B < \tan\alpha_A$ with respect to the angle $\alpha_C$ in the lug groove direction of the shortest pitch length, but does not vary at the same ratio as the change ratio of the pitch lengths $(A-W)$, $(B-W)$ and $(C-W)$.

The angle $\alpha_C$ in the lug groove direction of the greatest pitch length is varied so as to satisfy the relation $\tan\alpha_C < \tan\alpha_B < \tan\alpha_A$ and at the ratio of $(A-W)$, $(B-W)$, $(C-W)$. In the type of the present invention shown in FIG. 3(2), therefore, the circumferential length (block length) of each of the $N_1$ line towards the center and the $N_3$ line towards the shoulder corresponds to the pitch length, but at the portion of the intermediate line $N_2$ where the pitch length varies, an intermediate block length occurs. (Though the change of numeric values is shown in FIG. 3(2), it goes without noting that it occurs continuously.)

In the type shown in FIG. 3(3), the circumferential length (block length) of the $N_1$ line towards the center corresponds to the length which is the balance obtained by reducing the groove width from the pitch length, but at the portions of the $N_2$ and $N_3$ lines where the pitches vary, the intermediate block length varies. (That is to say, the number of the intermediate pitches becomes greater than in the type which in FIG. 3(2)).

FIG. 3(4) shows an example which is somewhat different from the type shown in FIG. 3(3).

As described above, the conventional method can provide only the length corresponding to the balance obtained by reducing the groove width from the pitch length as the block length in the circumferential direction, but the present invention can provide the intermediate pitch block length at the portions where the pitch varies, that can not been obtained by the conventional method. Accordingly, the present invention can improve the pattern noise obtained by the heretofore known pitch variation, without changing the basic design.

The description that has so far been given represents only the basic embodiment, and the present invention can of course be practised on the basis of the same concept when the lug grooves are arranged zigzag.

The following is an experimental example of the present invention to definitely demonstrate the effect thereof.

EXPERIMENTAL EXAMPLE

Test tires which had a size of 205/50 R 15 and an ordinary radial tire structure were fitted to a car. After the speed of the car was raised to 100 km/hr on a flat linear road surface, the engine was cut off so as to measure indoor noise while the car was moving inertially. The result is shown in FIG. 4.

Figure 4:
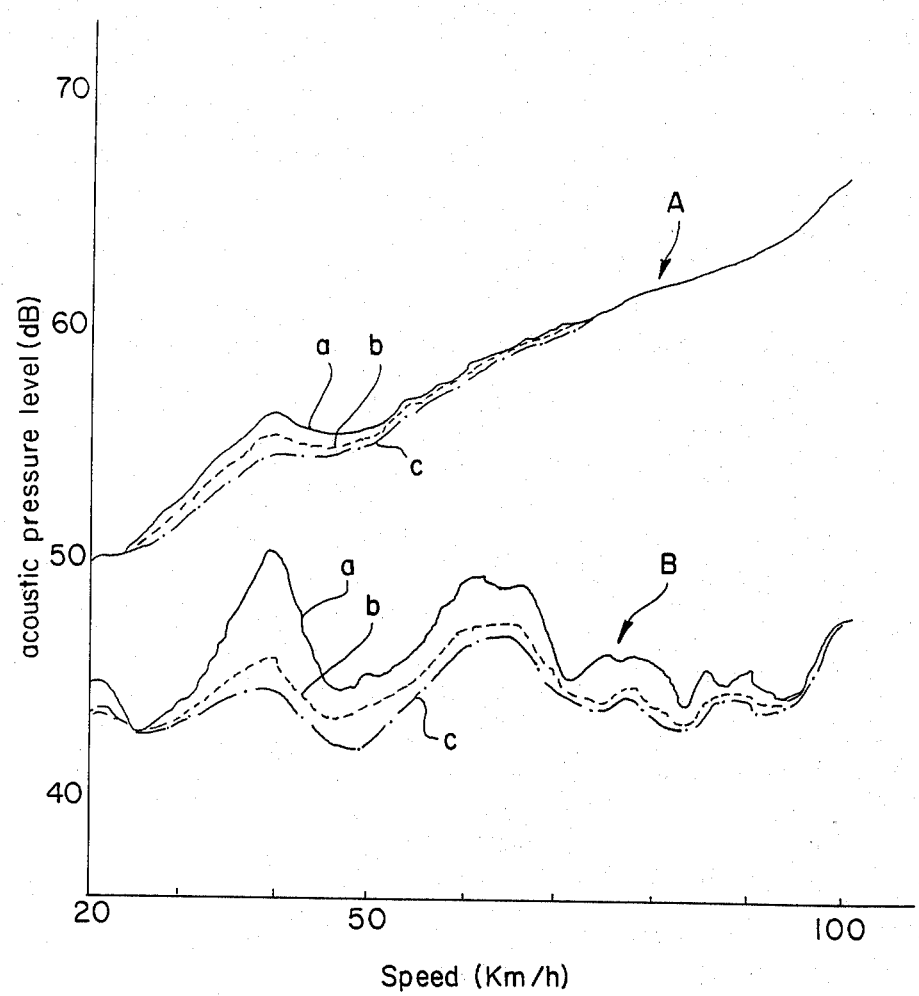
FIG. 4 is a diagram showing the relation between the driving speed and the acoustic pressure level.

In FIG. 4, a symbol A shows the overall sound levels, A-weighted sound levels, and B does primary pitch noise, tracking with 50 Hz band. A symbol a is the conventional tire in which the pitch variation is made in a customary manner, b does the tire of the present invention having the tread pattern shown in FIG. 1, and c does the tire of the present invention having the tread pattern shown in FIG. 2.

As can seen clearly from FIG. 4, the primary pitch noise levels and A-weighted sound levels are reduced in the tires b and c of the present invention in comparison with the conventional tire a, and the pattern noise is also reduced. The effect becomes particularly remarkable in the ordinary driving at a speed of from 40 to 50 km/hr.

The embodiments of the invention in which an exclusive property or privilege is claimed are defined as follows:

1. In a tire tread pattern in which a plurality of block patterns are disposed on a tire tread surface in the circumferential direction and their pitch lengths are varied, the improvement wherein lug grooves within said block patterns extend in the direction of the grounding width of the tire tread surface, and the angles of said lug grooves relative to said direction of grounding width correspond to the changes of the pitch lengths of said block patterns, wherein, with reference to FIG. 1 of the drawing, $\tan\alpha_{C'}:\tan\alpha_{B'}:\tan\alpha_{A'} = \tan\alpha_C:\tan\alpha_B:\tan\alpha_A = C-W:B-W:A-W$ where W represents the width of said lug grooves.

2. In a tire tread pattern in which a plurality of block patterns are disposed on a tire tread surface in the circumferential direction and their pitch lengths are varied, the improvement wherein lug grooves within said block patterns extend in the direction of the grounding width of the tire tread surface, and the angles of said lug grooves relative to said direction of grounding width correspond to the changes of the pitch lengths of said block patterns, wherein, with reference to FIG. 3(2) of the drawing, $\alpha_A = \tan^{-1}b/L$, $\alpha_B = \tan^{-1}c/L$, $\alpha_C = \tan^{-1}d/L$, and $\tan\alpha_A:\tan\alpha_B:\tan\alpha_C = (A-W):(B-W):(C-W)$, where W represents the width of said lug grooves.

* * * * *